United States Patent
Creeden et al.

(10) Patent No.: US 9,627,838 B2
(45) Date of Patent: Apr. 18, 2017

(54) HIGHLY EFFICIENT THULIUM DOPED FIBER LASER

(71) Applicant: BAE Systems Information and Electronic Systems Integration Inc., Nashua, NH (US)

(72) Inventors: Daniel J. Creeden, Nashua, NH (US); Benjamin R. Johnson, Nottingham, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 13/827,426

(22) Filed: Mar. 14, 2013

(65) Prior Publication Data
US 2013/0322470 A1 Dec. 5, 2013

Related U.S. Application Data

(60) Provisional application No. 61/655,751, filed on Jun. 5, 2012.

(51) Int. Cl.
H01S 3/067 (2006.01)
H01S 3/16 (2006.01)
H01S 3/094 (2006.01)

(52) U.S. Cl.
CPC ...... *H01S 3/0675* (2013.01); *H01S 3/094042* (2013.01); *H01S 3/1616* (2013.01); *H01S 3/06754* (2013.01); *H01S 3/094003* (2013.01); *H01S 3/094007* (2013.01); *H01S 3/094011* (2013.01)

(58) Field of Classification Search
CPC .. H01S 3/067; H01S 3/094003; H01S 3/1616; H01S 3/094042
USPC .............................................. 372/6
See application file for complete search history.

(56) References Cited

U.S. PATENT DOCUMENTS

| | | | |
|---|---|---|---|
| 7,813,390 B2 * | 10/2010 | Luo et al. | 372/32 |
| 8,611,003 B2 * | 12/2013 | Ahn et al. | 359/341.3 |
| 2002/0168139 A1 * | 11/2002 | Clarkson et al. | 385/27 |
| 2003/0234977 A1 * | 12/2003 | Kane et al. | 359/341.3 |
| 2011/0064096 A1 * | 3/2011 | Shah et al. | 372/6 |
| 2011/0150011 A1 * | 6/2011 | Young et al. | 372/6 |

OTHER PUBLICATIONS

J. Zhang et al., Record-Efficient Resonantly Cladding-Pumped Yb-free Er-doped LMA Fiber Laser (Optical Society of America, 2011), paper AtuD2.pdf.
M. Meleshkevich, N. Platonov, D. Gapontsev, A. Drozhzhin, V. Sergeev, and V. Gapontsev, "415W Single-Mode CW Thulium Fiber Laser in all-fiber format," in CLEO/Europe and IQEC 2007 Conference Digest, (Optical Society of America, 2007), paper CP2_3.

(Continued)

*Primary Examiner* — Michael Carter
(74) *Attorney, Agent, or Firm* — Daniel J. Long; Davis & Bujold, PLLC; Scott J. Asmus

(57) ABSTRACT

In the method of generating high power light with high efficiency and low thermal loading, the improvement comprising the steps of resonantly pumping a first thulium-doped fiber laser with a second thulium-doped fiber last, said second thulium-doped fiber laser having a shorter wavelength than said first thulium-doped fiber laser.

8 Claims, 3 Drawing Sheets

(56) References Cited

OTHER PUBLICATIONS

Alexander Hemming, Shayne Bennetts, Nikita Simakov, John Haub, Adrian Carter, "Development of resonantly cladding-pumped Holmium-doped fibre lasers," in Proc. SPIE. 8237, Fiber Lasers IX: Technology, Systems, and Applications 82371J (Feb. 9, 2012).
T. Ehrenreich et al., "1kW, all-glass Tm:fiber laser," Proc. SPIE 7580, xxxvii (2010).
Tsai-wei Wu, "Toward Diffraction-Limited High Power Fiber Laser Sources," Dissertation. University of Michigan, 2010.
P. Sprangle et al. "High-Power Fiber Lasers for Directed-Energy Applications," 2008 NRL Review.
Rudiger Paschotta. "High-power Fiber Lasers and Amplifiers," http://www.rp-photonics.com/high_power_fiber_lasers_and_amplifiers.html.
M.A. Dubinskii, "Ultra-high Efficiency Erbium-doped Fiber Lasers and Amplifiers", in Frontiers in Optics 2012/Laser Science XXVIII, OSA Technical Digest (online) (Optical Society of America, 2012), paper FTu1G.1.
Gapontsev et al., "Diffraction Limited Ultra-High-Power Fiber Lasers", Conference Paper. Advanced Solid-State Photonics, San Diego, CA. Jan. 31-Feb. 3, 2010. Only Abstract available.
Friebele et al., "Erbium nanoparticle doped fibers for efficient, resonantly-pumped Er-doped fiber lasers", in Fiber Lasers XII: Technology, Systems, and Applications, edited by L. Brandon Shaw, John Ballato, SPIE vol. 9344, 934412. Mar. 4, 2015.

\* cited by examiner

HIGHLY EFFICIENT THULIUM DOPED FIBER LASER

RELATED APPLICATIONS

This application claims the benefit of U.S. Provisional Applications No. 61/655,751 filed Jun. 5, 2012 which is herein incorporated by reference in its entirety for all purposes.

FIELD OF THE INVENTION

The present invention relates to diode-pumping to generate laser light and, more particularly, to diode-pumped Thulium-doped fiber lasers.

BRIEF DESCRIPTION OF PRIOR DEVELOPMENTS

It is common practice to diode-pump a gain medium for laser generation. For instance, thulium-doped fiber lasers (TDFL) are pumped with diodes at 795 nm or with fiber lasers at roughly 1,500 nm. Though the use of a diode increases efficiency, it leads to significant waste heat in a fiber. For high power systems with greater than 100 W of output power, the efficiency is roughly only 50%, and therefore the heat generated in the Tm-doped fiber can be high. For these systems with 100 W of output power or more, the heat generated in the fiber would be on the same order as the optical output. With these high power systems, where the amount of heat generated can be equivalent to or exceed the amount of optical power generated, the fibers may become extremely hot and possibly damaged, limiting power scaling potential for a single fiber laser.

Currently, the highest reported powers from Tm-doped fiber lasers is ~1 kW. Power scaling for a ~795 nm diode pumped Tm-doped fiber lasers is limited by the amount of waste heat in the fiber, which is directly proportional to optical conversion efficiency within the fiber. Typically, efficiencies of 50-60% are achieved in Tm-doped fiber lasers. In these systems, 40-50% of the unconverted pump light may contribute to heating in the fiber itself. For example, In the Q-peak reference, the laser was only 50% efficient (this efficiency is made possible by the 2-for-1 cross-relaxation process of the Tm ion where one 795 nm photon can create two excited electrons in the Tm ion, both of which can convert to a 2-micron photon—hence the 2-for-1). This means that for 1 kW of output power, 2 kW of 795 nm pump power was required. Since only 1 kW of that pump light was converted to optical power in the 2-micron spectral region, 1 kW of waste heat was generated in the fiber. This excess heating leads to a thermal breakdown of the fiber itself and/or the coating on the exterior of the fiber. As a result, power scaling such a laser is difficult due to the inefficiency and the optical damage due to waste heating.

An alternative to diode pumping at 795 nm is by fiber laser pumping at ~4550 nm. Thulium has broad absorption in the 1500 nm region, and as a result, can be pumped by 1550 nm light. One way to generate 1550 nm light is through a Erbium-doped fiber laser (or a ytterbium sensitized erbium doped fiber laser). In this case, 915-975 nm diodes are used to pump an Er:Yb-doped fiber, generating 1550 nm light. This 1550 nm power can then be used to core or cladding pump a Tm-doped fiber for generation of 2-micron light. A limitation of this approach is that the pump source is a fiber laser. As a result, the pump lasers tend to be ~20% efficient (50% efficient 915-975 nm diodes and 40% efficient Er:Yb fiber laser). This decreases the overall electrical-to-optical efficiency of the Tm-doped fiber laser. Even with an optical conversion efficiency of 60%, the overall electrical efficiency of the laser will be ~12%. In addition, there is still a significant amount of waste heat generated in the Tm-doped fiber as a result of the unconverted pump. For a 100 W Tm-doped fiber laser pumped with an Er:Yb fiber laser, ~180 W of 1550 nm light would be required. If the Tm-doped fiber laser had an optical efficiency of 60%, there would be 80 W of waste heat generated in the fiber. At this low power level, optical damage would not be an issue; however, for power scaling, this poses the same concern as direct 795 nm diode pumping. With the recent advancement in 1500 nm diodes, this could also be a pumping approach; however, the waste heat in the Tm-doped fiber would remain the same as with an Er:Yb fiber laser pump.

Ho-doped fiber lasers have recently been demonstrated. Typically, Ho-doped fibers are pumped with Tm-doped fiber lasers and offer a low quantum defect. However, Ho-doped fibers emit in the 2.1-micron range. In silica fibers 2.1-microns light has high loss due to scattering and absorption. Because of this, fairly low efficiencies of only 60% have been demonstrated.

A need, therefore exists, to generate high power light with high efficiency and low thermal loading on the fiber.

SUMMARY OF THE INVENTION

Increasing optical efficiency is the key to reducing thermal loading in the fiber itself, minimizing thermal cooling requirements on the fiber. This is critical for very high power systems, where the amount of heat generated can exceed the amount of optical power generated, resulting in fibers getting very hot and possibly damaging. By pumping in the 1.6-1.9 um range, the efficiency can be increased due to the lower quantum defect, and as a result, the amount of heat generated in the Tm fiber is reduced. However, generating light in this 1.6-1.9 um spectral region can be difficult. Diodes exist, but they are not as bright (i.e. low in output power) which leads to low output power from the fiber laser. In addition, diodes in this spectral range have thermal issues and are inefficient.

However, by resonantly pumping a thulium-doped fiber laser with another thulium-doped fiber laser (operating at a shorter wavelength), high output power and efficiency can be achieved with very little thermal loading in the fiber.

Previously, a Tm-doped fiber laser with 50% efficiency was the highest that could be expected; however, for multi-kW systems, 50% efficiency leads to a large amount of waste heat. Previously, 795 nm diodes provided the most practical, compact, and efficient Tm-doped fiber lasers for scaling to the ~1 kW level. However, for powers exceeding 1 kW, 795 nm diodes are limited in brightness. In addition, the 50% efficiency associated with the 795 nm conversion to 2-micron light in the Tm-doped fiber creates too much waste heat, limiting power scaling to the 1 kW level. The present invention proposes a novel pumping method for Tm-doped fiber lasers, wherein a Tm-doped fiber laser operating in the 1.9 μm to 1.94 μm region, for example, is used as a pump source for another Tm-doped fiber laser, operating at a longer wavelength (i.e. at 2 μm). The advantage to this pumping approach is that the quantum defect from 1.9 μm to 2.0 μm is only 5%, meaning that optical conversion efficiency can be very high. Previously, then, pumping at 1550 nm has a quantum defect of 22.5%, resulting in more waste heat.

The absorption in Tm-doped fibers in the 1.8-1.9 μm region is fairly low in comparison; however, the low absorption is easily overcome by increasing fiber length to absorb more of the pump light. The result of such a pumping approach is less thermal loading in the Tm-doped fiber. Practical efficiencies of >80% can be achieved. This means that for a 1 kW 2 μm Tm-doped fiber laser, only 1.25 kW of 1.9 μm pump power would be required, and only 250 W of waste heat would be generated in the Tm-doped fiber laser. This is significantly less waste heat than pumping with 795 nm diodes or with 1550 nm fiber lasers. This lower thermal loading means that the power can be scaled to much higher optical powers prior to thermal degradation or damage of the fiber laser occurs.

Previously, the poor overall electrical-to-optical conversion efficiency as a result of the conversion from 795 nm diodes to 1.9 μm pump fight in a Tm-doped fiber laser (similar to the Er:Yb pumping approach) was a major limitation of this approach. This is because 795 nm diodes are generally ~50% efficient, and 1.9 μm Tm-doped fiber lasers are generally ~50% efficient. Because of this, the Tm fiber pump lasers are ~25% electrically efficient—in other words, extremely inefficient. Even though the 2 μm fiber laser is >80% optically efficient (converting 1.9 μm light to 2 μm light), that still results in an overall poor electrical efficiency of >20%. Previously then, conventional 795 nm pumped Tm-doped fiber lasers have electrical efficiencies of 25% (50% efficient diodes, 50% efficient fiber laser).

However, one of the aspects of this invention is that the method takes advantage of the 1.9 μm Tm-doped fiber laser pumping decreased thermal loading in the 2.0 μm Tm-doped fiber laser, allowing for higher power scaling above the 1 kW level. The prior art is correct in that for power levels below 1 kW, Tm-pumped Tm fiber lasers will not be as efficient as 795 nm diode pumped Tm-doped fiber lasers. The prior art shows that 795 nm pumping cannot be power sealed above 1 kW, whereas one embodiment of the invention can allow for up to 4 kW of power prior to thermal issues and damage. This type of pumping approach would require the combination of several lower power ~1.9 μm fiber lasers. For example, seven 200 W 1.908 μm could be combined in a conventional tapered fiber bundle for a total pump power of 1.4 kW. Extracting at 80% would result in a 2-micron output power of 1.12 kW.

This allows for power scaling of very high power lasers and amplifiers without the need for complex thermal management schemes. Most diodes are highly multimode, limiting the total amount of power that can be combined into a single fiber. For power scaling, generally the outer diameter of the fiber must increase to accommodate the low brightness of the diodes. Fiber lasers; however, take a lower power diode (or diodes) and convert it to near single-mode output. The result is that the pump source is near diffraction-limited. A single-mode Tm-doped fiber laser can have a core diameter of 20 μm with an NA of 0.1. Diodes generally have core diameters ranging from 105-400 μm with 0.22 NA (which is highly multimode). Due to the large fiber diameters of the diodes, the total number that can be combined into a single fiber is limited. With a high power, single-mode pump source, more pump lasers can be combined into a single fiber cladding, allowing for more power scaling. So this invention has two primary benefits: more power scaling potential due to a brighter pump source, and lower thermal loading in the high power fiber.

BRIEF DESCRIPTION OF THE DRAWINGS

The present invention is further described with reference to the accompanying drawings wherein.

DETAILED DESCRIPTION OF THE PREFERRED EMBODIMENT

One embodiment of this invention is to resonantly pump a Tm-doped fiber laser or amplifier in the 1.6-1.9 micron wavelength range. By developing several smaller power fiber lasers operating in the 1.6-1.9 micron region, these lasers can be used as a pump source for generating 2-micron light in a Tm-doped fiber laser. Pumping in this range can yield up to 80-95% quantum efficiencies (QE). With this high efficiency, very little waste heat is gel rated in the fiber, especially compared to pumping with a diode at 795 nm.

Figure 1:
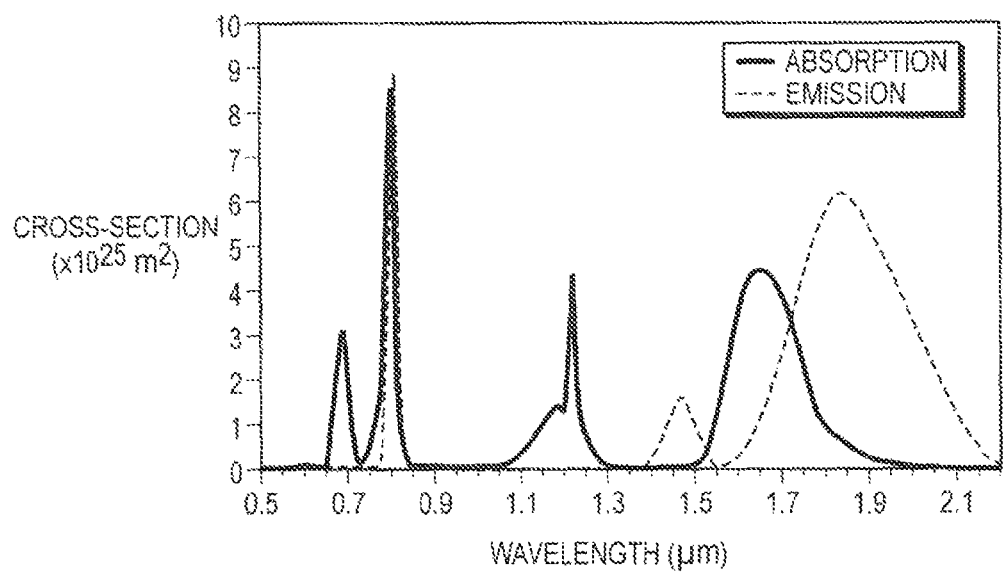
FIG. 1 shows the absorption and emission cross-sections of a type Tm-doped silica fiber as a function of wavelength.

FIG. 1 is a graphical representation of the wavelengths at which thulium can be pumped and emitted. By pumping in the 1.9 micron range, one can achieve absorption in the fiber which produces a small quantum defect. This results in extremely efficient lasing for significant power scaling.

Figure 2:
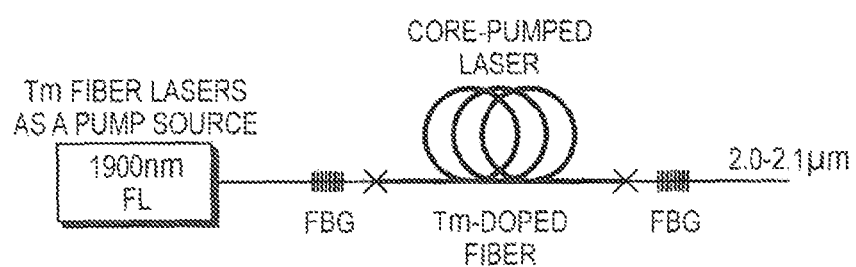
FIG. 2 shows a core-pumped laser using Tm Fiber Lasers as a pump source.

FIG. 2 depicts a resonantly-pumped Tm fiber laser, more particularly, a core-pumped laser. In this embodiment, a 1908 nm laser is used to pump the core of another Tm-doped fiber laser. The output of the resonant Tm fiber laser can be from 1.92 to 2.2 microns. FBG is a fiber Bragg grating.

Figure 3:
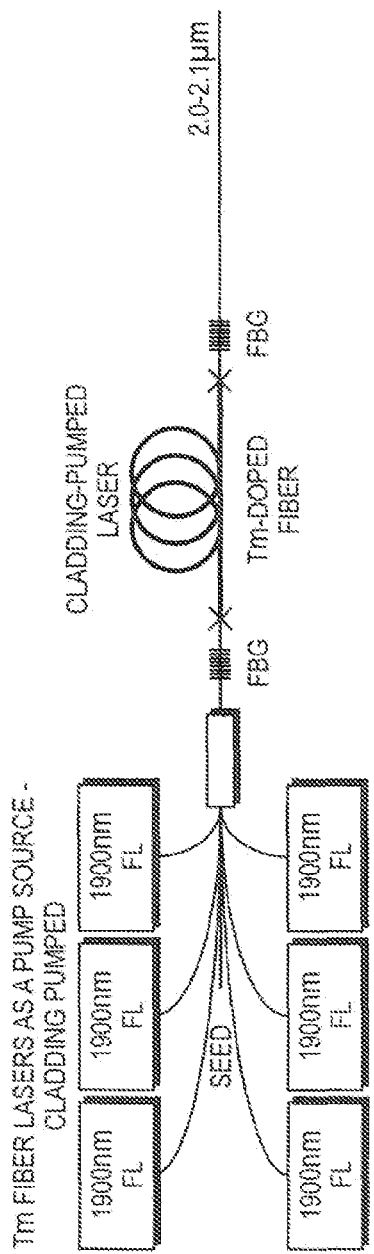
FIG. 3 shows a cladding-pumped laser using multiple fiber lasers as a pump source.

FIG. 3 depicts a resonantly-pumped Tm fiber laser, more particularly, a cladding-pumped laser. In this embodiment, multiple 1908 nm fiber lasers (1700 nm fiber lasers, 1800 nm fiber lasers, 1940 nm fiber lasers, or any combination thereof) are used to pump the cladding of a Tm-doped fiber laser. Six lasers are shown, but more may be used for power scaling. FBG is a fiber Bragg grating.

Figure 4:
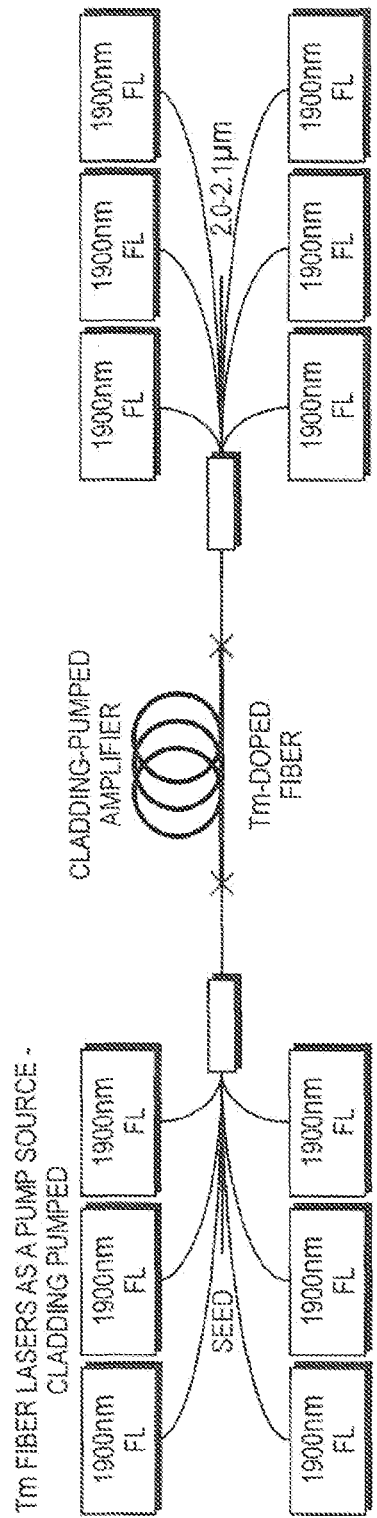
FIG. 4 shows a cladding-pumped amplifier using multiple fiber lasers as a pump source.

In accordance with FIG. 4, the present invention may also be implemented in an amplifier configuration. According to this embodiment, a seed signal is fed into a Tm-doped fiber amplifier (TDFA), wherein the amplifier is pumped by Tm fiber lasers. This embodiment is particularly successful in higher power fiber laser beams, where a common seed (or multiple seeds) can be fed into a series of fiber amplifiers.

Figure 5:
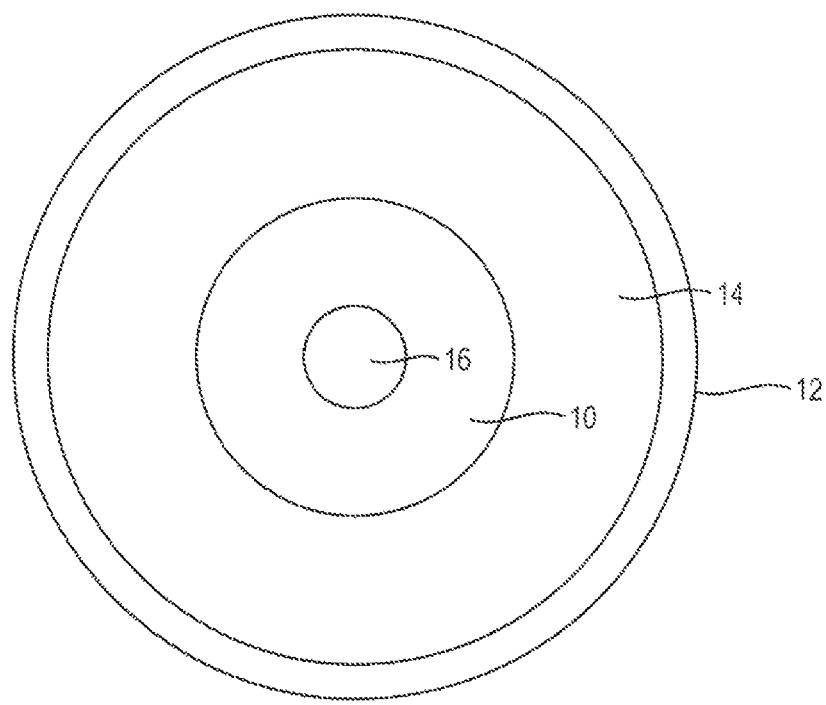
FIG. 5 is a vertical cross-sectional view of a preferred embodiment of the fiber of the invention.

FIG. 5 is a graphical representation of a cross-section of a fiber used in one embodiment of the invention. In this embodiment, and for power sealing to very high levels, cladding pumping is the preferred method. This is because you can combine multiple single mode fibers into the multimode cladding of a fiber. However, to avoid acrylate damage, the second cladding must provide waveguiding to the 1908 nm pump without absorbing that power.

In testing this embodiment of the invention, it was discovered that a typical double-clad fiber would not be suitable for cladding pumping. In that embodiment, the second cladding in this case is an acrylate coating with a low index of refraction (~1.36). This low index allows for pump light to propagate in the glass cladding. For 795 nm pump sources, this acrylate performs quite well. This is the type of fiber used for the embodiment including 1908 nm lasers. However, the acrylate protective coating 12 is absorptive at long wavelengths (1.8→2 μm). This means that as pump light propagates in the cladding, it get absorbed in the coating 12. This causes a loss of pump light as well as heating of the coating 12. With enough pump power, this can lead to damage to the coating, prohibiting efficient power scaling. In this embodiment, in order to use a 1908 nm fiber laser to pump this type of Tm-doped fiber, one must core pump the fiber producing a Tm-doped core 16.

FIG. 5 is an example of a fiber which would be appropriate. In this embodiment, the outer cladding 14 is glass, not acrylate. The pump light will propagate in the inner cladding 10, with the glass outer cladding 14 having a low index to provide waveguiding to the inner cladding 10, where the 1908 nm power propagates. There is still an acrylate protective coating 12 on the outside of the glass, but this serves as a protectant to the fiber only. It does not have any optical functionality. For scaling to very high powers, it may even be necessary to remove the acrylate coating 12, as its melting point is significantly lower than that of glass and may ultimately limit total power scaling potential.

While the present invention has been described in connection with the preferred embodiments of the various figures, it is to be understood that together similar embodiments may be used or modifications and additions may be made to the described embodiment for performing the same function of the present invention without deviating there from. Therefore, the present invention shouldn't be limited to any single embodiment, but rather construed in breadth and scope in accordance with the recitation of the appended claims.

What is claimed is:

1. A method of generating high power light with high efficiency and low thermal loading, comprising the steps of:
   pumping, resonantly, a thulium-doped fiber laser comprising a thulium-doped fiber having a thulium-doped core, an inner glass cladding, an outer glass cladding and a protective layer, with one or more thulium doped fiber lasers in the 1.6 to 1.9 micron range and said one or more thulium-doped fiber lasers output propagates within the thulium-doped core of the thulium-doped fiber to produce an output in the 1.92 to 2.2 micron range with a quantum efficiency between 80% and 95%.

2. The method of claim 1, wherein said one or more thulium-doped fiber lasers resonantly pumps a cladding of said thulium-doped fiber.

3. The method of claim 1, further comprising generating waste heat by the pumping, wherein the waste heat is less than 250 W.

4. A system of generating high power light comprising:
   a thulium-doped fiber laser comprising a thulium-doped fiber having a thulium-doped core, an inner glass cladding, an outer glass cladding and a protective layer; and
   one or more thulium-doped fiber lasers; wherein said one or more thulium-doped fiber lasers resonantly pump said thulium-doped fiber laser and said one ore more thulium-doped fiber lasers output propagates within the thulium-doped core of the thulium-doped fiber to produce an output in the 1.92 to 2.2 micron range, the system having a quantum efficiency of between 80% and 95%.

5. The system of claim 4, wherein said one or more thulium-doped fiber lasers further comprises a 1908 nm laser.

6. The system of claim 4, wherein said one or more thulium-doped fiber lasers resonantly pumps the thulium-doped core of said thulium-doped fiber.

7. The system of claim 4, wherein said one or more thulium-doped fiber lasers resonantly pumps a cladding of said thulium doped fiber.

8. The system of claim 4, wherein said protective layer comprises an acrylate protective coating.

* * * * *